Sept. 19, 1961 W. H. DUCKER ET AL 3,000,426
METHOD AND APPARATUS FOR TRUING CIRCULAR RINGS
Filed Nov. 29, 1957
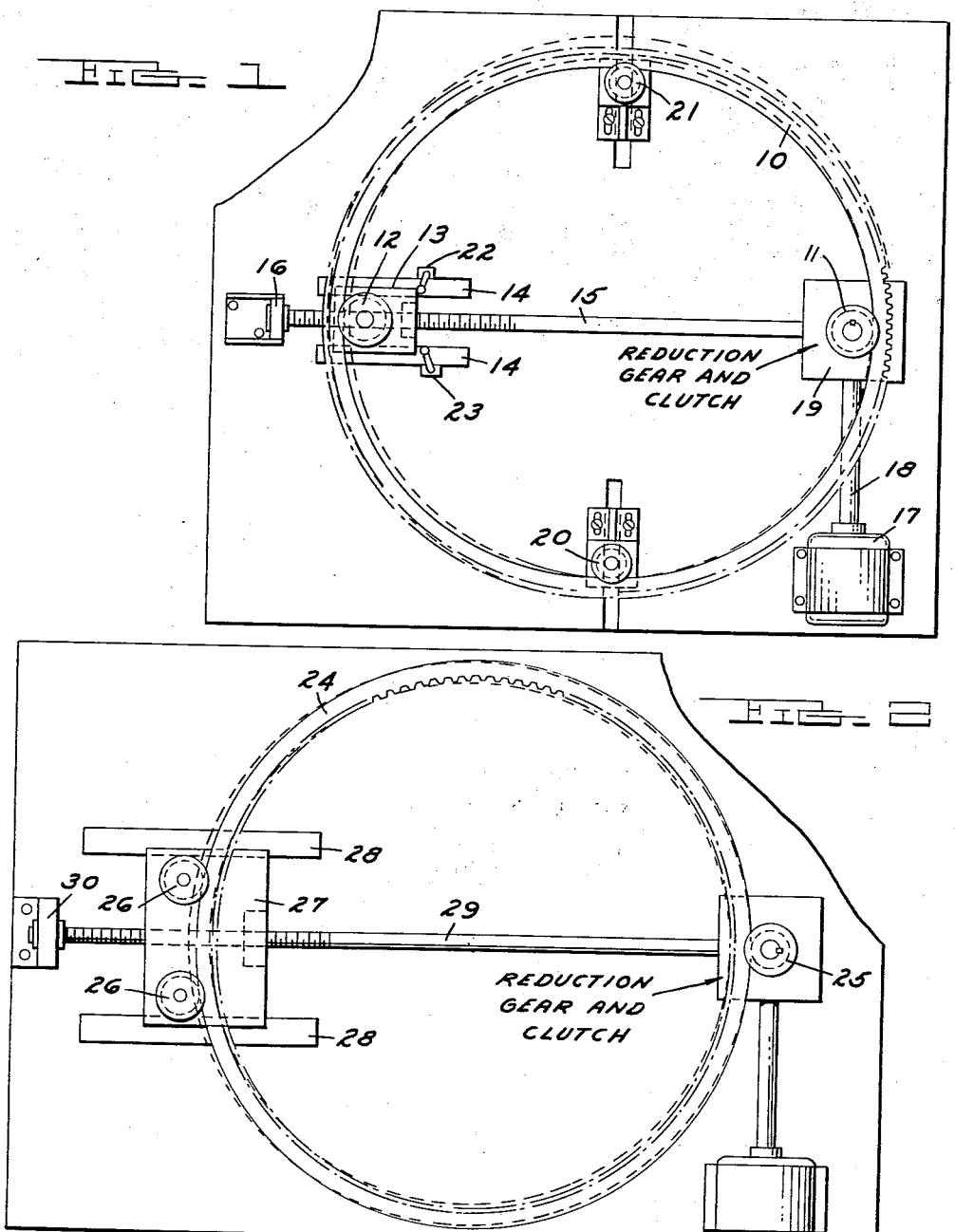
INVENTORS
WILLIAM H. DUCKER
LEE K. FISHER
BY
*Farley, Forster & Farley*
ATTORNEYS

United States Patent Office

3,000,426
Patented Sept. 19, 1961

3,000,426
METHOD AND APPARATUS FOR TRUING CIRCULAR RINGS
William H. Ducker, Birmingham, and Lee K. Fisher, Royal Oak, Mich., assignors to Cargill Detroit Corporation, Birmingham, Mich., a corporation of Michigan
Filed Nov. 29, 1957, Ser. No. 699,699
8 Claims. (Cl. 153—32)

This invention relates to a method and apparatus for restoring a true circular contour to rigid metal ring members which have become distorted to an out-of-round condition as in heat treating, stress relieving, welding or original fabrication.

Specific applications include internal and external ring gears, one-way clutch races, bearing races, wheel rims and the like. In general, the process and apparatus are applicable to the truing of any circular rigid ring member having appropriate physical properties including a substantial spread between yield and ultimate strength.

The method is characterized by progressively locally deflecting the entire ring beyond the yield point to a gradually reduced extent as by rotating the ring about its axis while impressing an elliptical contour thereon which is gradually relaxed to a circular form. The initial deflection, rate of rotation and rate of relaxation are coordinated to stress the ring substantially but only sufficiently beyond the initial yield point of a perfect circular ring to produce a correction within the desired tolerance for out-of-roundness while the rate of relaxation relative to the rate of rotation is preferably near the maximum that will produce correction within such desired tolerance.

The apparatus for carrying out this method preferably consists of a fixed axis drive roller for engaging a smooth outer or inner perimeter of the ring, one or more load rollers at least one of which has a variable axis to impress desired deflection on the ring which may be gradually relaxed to cause the ring to assume a true circular contour. In the case where deflection is effected by two diametrically opposed load and drive rollers, one or more circumferentially spaced guide rollers may be employed for stabilizing the rotational travel of the ring. The drive and load rollers may be located internally of the ring bearing radially outwardly thereon, or externally to impose a radial compressive load across the ring. With rings having gear teeth or other projections on the inner or outer perimeter with a smooth opposite surface, the rollers will normally be located to act on the smooth perimeter.

While there are no known exact rules for calculating in advance for any given production ring, the exact initial deflection nor rate of reduction of deflection relative to rate of rotation of the ring to produce required correction, the following approach has been successfully employed in determining these factors from initial test parts: (1) From the diameter and section of the ring together with available or assumed values for hardness and yield point strength of the material in the ring, an initial deflection is computed sufficient to stress approximately 50% of the cross section to a yield point stress; (2) a production part is selected having a maximum order of deformation and placed in the apparatus whereupon such calculated deflection is applied prior to starting rotation; (3) a relatively low rate of withdrawal per revolution of the ring is initially employed, which may be in the order of the total acceptable out-of-round tolerance for the part per revolution in the case where deflection load is applied to the ring at two points through a single fixed drive and single variable load roller; (4) if such test part remains out-of-round more than the allowable tolerance, the initial deflection is increased and the test repeated successively until an adequate initial deflection is determined; if, on the other hand, the tolerance is met in the first test run, successive tests at progressively reduced initial deflections are run until a minimum dependable initial deflection is determined; (5) thereafter tests are repeated with progressively higher rates of load relaxation until a maximum rate is found which does not adversely affect accuracy of correction.

A minimum initial deflection and maximum rate of relaxation of load consistent with meeting desired tolerances in the finished ring are preferred for production runs in order to minimize severeness and frequency of cyclic stress loading beyond yield point, which might otherwise lead to undue work hardening or fatiguing of the metal, as well as to minimize the time cycle for the truing operation for a given rate of rotation. Such rate of rotation may then be determined from production requirements. Once such test procedure has established suitable values of initial deflection and rate of relaxation per revolution for a typical production part having a maximum order of initial deformation, all production parts will be automatically corrected within desired tolerance when subjected to the same operation notwithstanding varying degrees of initial deformation. Thus, the process and apparatus lend themselves to complete automation in the truing of production runs of similar rigid circular rings.

Illustrating preferred apparatus for carrying out the method, FIGURE 1 is a schematic plan view of ring stressing and rotating apparatus wherein drive and load rollers are adapted to engage the inner perimeter; and FIGURE 2 is a similar schematic view of a modified apparatus adapted to engage the outer ring perimeter.

Referring to FIGURE 1, apparatus is shown for stressing a ring workpiece 10, in the present instance an external ring gear, by diametral load applied through a drive roller 11 having a fixed axis of rotation and an idling load roller 12 mounted for rotation on block 13 slidable on ways 14 under the control of a drive screw 15 threaded through the block 13 and axially anchored in a fixed support 16. The power roller 11 and feed screw 15 are driven at a coordinated ratio through a common reversible motor 17, drive shaft 18 and appropriate reduction gear set 19 drivingly connected to the power roller 11 through a releasable clutch and to the feed screw 15 at all times. Guide rollers 20 and 21 are adapted to contact the ring at initial deflection as shown in order to stabilize the rotation of the ring when driven by the single power roller 11. Limit switches 22 and 23 are provided to signal when the limits of deflection and retraction are reached for use in automatic cycling of the apparatus.

In operation, the ring 10 is placed on the apparatus by manual or appropriate automatic means with the roller 12 in retracted position and with the clutch for roller 11 disengaged. The motor 17 is started in a direction which will actuate feed screw 15 to move the roller 12 outwardly to the initial deflection position shown, whereupon limit switch 22 signals for reversal of the motor and engagement of the clutch for drive roller 11 through suitable automatic controls, not shown. The reversal of the drive screw 15 thereupon gradually withdraws roller 12 in timed relation to the rate of rotation of the ring 10 by drive roller 11 until actuation of limit switch 23 indicates completion of the operation.

In FIGURE 2, a similar apparatus is shown adapted to apply a radial compressive load to a ring workpiece 24, in this case an internal ring gear, through a single drive roller 25 and a pair of idling load rollers 26 mounted on block 27 slidable on ways 28 under the control of feed screw 29 axially anchored at 30. In this case, initial deflection is in a radially compressive direction as shown and retraction of the load rollers 26 is effected during the synchronized rotation of the ring 24 by power roller 25 in a manner similar to the apparatus of FIGURE 1. Since a pair of circumferentially spaced load rollers are employed establishing with the power roller three circumferentially spaced points of contact with the ring 24, no auxiliary guide rollers such as 20, 21 in FIGURE 1 are required.

Alternative roller arrangements may be employed. For example, it is feasible to employ equally spaced drive, fixed reaction and variable reaction rollers in an equilateral triangular pattern. It should be noted however that in such case three complete stress cycles would be imposed on the ring for each revolution as compared with two stress cycles per revolution where the load is established through a pair of rollers as in FIGURE 1 or where relatively closely spaced load rollers are employed as in FIGURE 2.

Numerous other modifications in the apparatus for deflecting the ring with a gradual reduction of stress are of course possible without departing from the scope of this invention as defined in the following claims.

We claim:

1. A method for truing to circular form out-of-round rigid rings characterized by locally deflecting the ring to a different curvature from the finally desired circular arc beyond yield point progressively and repeatedly around the entire ring, and reducing the extent of said deflection beyond yield point in successive cycles until the yield point is no longer exceeded.

2. The method of claim 1 wherein reduction of said deflection is gradually and continuously effected.

3. The method of claim 1 wherein the reduction of said deflection is effected at a rate in the order of the acceptable out-of-round tolerance or less per successive cycle of deflection.

4. The method of claim 1 wherein the reduction of said deflection is effected at a rate in the order of the acceptable out-of-round tolerance per successive cycle of deflection.

5. The method of claim 1 wherein a substantial proportion in the order of 50% of the cross section on each side of the neutral axis of said ring is stressed to yield point in the initial cycle of deflection.

6. The method of claim 1 adapted to a production run of ring workpieces by experimentally determining with a sample ring representative of maximum deformation the minimum initial deflection and maximum rate of reduction of deflection for successive cycles appropriate for meeting required tolerances, and thereafter applying said same minimum deflection and maximum rate of reduction of deflection to the truing of all ring workpieces of a production run regardless of any varying extent of original deformation therein.

7. Apparatus for truing out-of-round rigid metal rings characterized by means for locally deflecting the ring in a radial direction from a circular arc beyond yield point, means for rotating the ring about its axis relative to said first means while deflection continues, means for reducing said deflection during rotation, and means for coordinating the rate of said rotation and rate of said reduction.

8. Apparatus for truing out-of-round rigid metal rings characterized by means for locally deflecting the ring in a radial direction from a circular arc beyond yield point, means for rotating the ring about its axis relative to said first means while deflection continues, and means for reducing said deflection during rotation, said respective means including a fixed power roller, a variable load roller, means for varying the position of said load roller radially of said ring, and means synchronized with said last means for driving said power roller.

References Cited in the file of this patent

UNITED STATES PATENTS

| | | |
|---|---|---|
| 358,494 | Smith et al. | Mar. 1, 1887 |
| 881,398 | Hansen | Mar. 10, 1908 |
| 928,220 | Schneider | July 13, 1909 |
| 1,511,547 | Wasson | Oct. 14, 1924 |
| 1,547,250 | Wilson | July 28, 1925 |
| 1,548,731 | Mirfield | Aug. 4, 1925 |

FOREIGN PATENTS

| | | |
|---|---|---|
| 14,680 | Great Britain | 1893 |